(12) United States Patent
Dunkmann et al.

(10) Patent No.: US 9,971,362 B2
(45) Date of Patent: May 15, 2018

(54) METHOD FOR OPERATING A PNEUMATICALLY DRIVEN PLANT FOR HANDLING WORKPIECES AND A SYSTEM FOR HANDLING WORKPIECES

(71) Applicant: J. Schmalz GmbH, Glatten (DE)

(72) Inventors: Walter Dunkmann, Baden-Baden (DE); Thomas Holecek, Freudenstadt (DE)

(73) Assignee: J. Schmalz GmbH, Glatten (DE)

( * ) Notice: Subject to any disclaimer, the term of this patent is extended or adjusted under 35 U.S.C. 154(b) by 0 days. days.

(21) Appl. No.: 15/398,988

(22) Filed: Jan. 5, 2017

(65) Prior Publication Data

US 2017/0197796 A1 Jul. 13, 2017

(30) Foreign Application Priority Data

Jan. 13, 2016 (DE) .................... 20 2016 100 111 U

(51) Int. Cl.
*G05D 16/20* (2006.01)
*F16L 11/127* (2006.01)
*B65G 47/91* (2006.01)

(52) U.S. Cl.
CPC ....... *G05D 16/2066* (2013.01); *B65G 47/917* (2013.01); *F16L 11/127* (2013.01); *G05D 16/2006* (2013.01); *G05D 16/2013* (2013.01)

(58) Field of Classification Search
CPC . B65G 47/917; F16L 11/127; G05D 16/2006; G05D 16/2066
See application file for complete search history.

(56) References Cited

U.S. PATENT DOCUMENTS

| 5,188,411 | A | * | 2/1993 | Golden | B65G 47/91 |
| | | | | | 137/487.5 |
| 5,222,770 | A | * | 6/1993 | Helevirta | F16L 25/023 |
| | | | | | 174/47 |
| 5,961,169 | A | | 10/1999 | Kalenian et al. | |
| 6,186,191 | B1 | * | 2/2001 | Dornier | D03D 47/28 |
| | | | | | 138/36 |
| 7,677,622 | B2 | * | 3/2010 | Dunkmann | B65G 47/917 |
| | | | | | 294/188 |

(Continued)

FOREIGN PATENT DOCUMENTS

| DE | 198 17 426 A1 | 10/1999 |
| DE | 10 2004 047 853 A1 | 4/2006 |

(Continued)

*Primary Examiner* — Thomas Randazzo
(74) *Attorney, Agent, or Firm* — Aslan Law, P.C.

(57) ABSTRACT

A method for operating a pneumatically driven system for handling workpieces, comprising a plurality of pneumatic units that can be pneumatically operated or are used for pneumatic control, which have connections to pressure hoses and/or which are in fluid communication with each other by the use of pressure hoses, and comprising at least one control unit for driving at least one of the pneumatic units by the use of electrical signals and/or for receiving and evaluating electrical signals from at least one of the pneumatic units. The electrical signals are here transmitted between the control unit and at least one pneumatic unit via the pressure hoses, wherein an electric voltage is applied between at least two different pressure hoses that connect the control unit and the respective pneumatic unit.

13 Claims, 2 Drawing Sheets

(56) References Cited

U.S. PATENT DOCUMENTS

| | | | | |
|---|---|---|---|---|
| 8,082,943 | B2* | 12/2011 | Brenner | F15B 13/081 |
| | | | | 137/271 |
| 8,550,790 | B2* | 10/2013 | Tell | B65G 47/911 |
| | | | | 269/21 |
| 9,205,558 | B1* | 12/2015 | Zevenbergen | B25J 9/1664 |
| 9,468,163 | B2* | 10/2016 | Hashimshony | A01G 25/06 |
| 2006/0226701 | A1* | 10/2006 | Gatz et al. | F16L 11/127 |
| | | | | 307/9.1 |
| 2010/0308575 | A1* | 12/2010 | Rodenburg | F16L 11/127 |
| | | | | 285/256 |
| 2012/0136592 | A1* | 5/2012 | Pereira | F16L 11/086 |
| | | | | 702/50 |
| 2014/0265561 | A1* | 9/2014 | Beining | B60R 16/03 |
| | | | | 307/10.1 |
| 2015/0375401 | A1 | 12/2015 | Dunkmann et al. | |

FOREIGN PATENT DOCUMENTS

| | | |
|---|---|---|
| EP | 2 001 777 B1 | 12/2008 |
| EP | 2 960 024 A3 | 12/2015 |

* cited by examiner

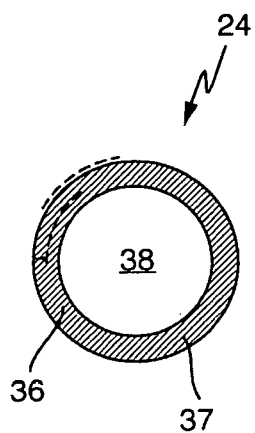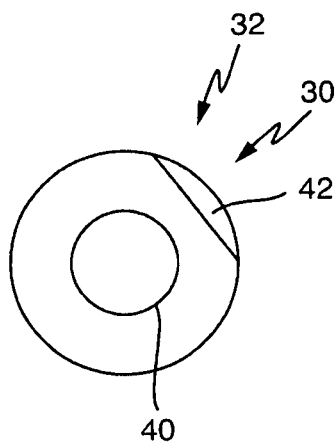
Fig. 3a    Fig. 3b
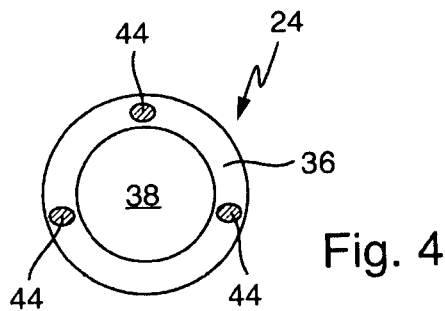
Fig. 4
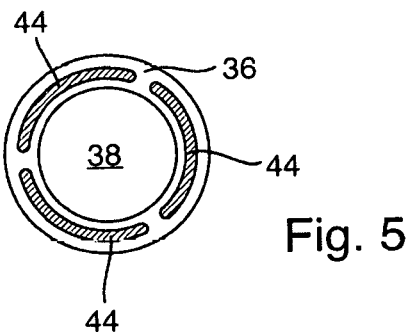
Fig. 5

METHOD FOR OPERATING A PNEUMATICALLY DRIVEN PLANT FOR HANDLING WORKPIECES AND A SYSTEM FOR HANDLING WORKPIECES

The invention relates to a method for operating a pneumatically driven system for handling workpieces according to the preamble of claim 1 as well as to a system for handling workpieces according to the preamble of claim 4.

Such methods and systems are employed for example in production lines or processing lines. These are in particular pneumatically operated systems that have at least one vacuum generator (e.g. an ejector) driven by pressurised air, which is in fluid communication with handling devices (e.g. vacuum grippers or actuators), in order to supply the required vacuum to the latter. Generally speaking, the systems mentioned comprise a plurality of pneumatic functional units that are connected to pressure hoses.

In order to drive the pneumatic functional units as needed, the systems as a rule also comprise corresponding control units. The required communication between a control unit and a pneumatic functional unit is carried out for example by means of electrical signals through data lines. It is for example known to couple the vacuum generators and valve units of a handling unit with a bus system which is in turn connected to a central control unit (e.g. DE 198 17 426 A1). It is also known (e.g. EP 2 001 777 B1) to use wireless communication between various units of a handling system. The communication units used are comparatively complex, which may lead to error susceptibility and additional installation cost.

The invention is based on the object of providing a handling system that can be configured in a flexible manner and operated in a reliable manner and of reducing installation cost for the construction.

This object is achieved by means of a method according to claim 1 as well as a system for handling workpieces according to claim 4.

The method is used for operating a system for handling workpieces. The system comprises a plurality of pneumatic units that can be pneumatically operated or that are used for pneumatic control. The pneumatic units have connections with pressure hoses and/or are in fluid communication with each other via pressure hoses. Preferably, this is a pneumatic system for handling workpieces, in which the pneumatic units are operated by means of pressurised air as the working fluid. The system further comprises at least one control unit that is designed for driving at least one of the pneumatic units by means of electrical signals and/or that is designed for receiving and evaluating electrical signals from at least one of the pneumatic units.

For the transmission of the electrical signals between the control unit and the pneumatic unit, both the control unit and the pneumatic unit each have signal interfaces, by means of which an electrical signal transmission via signal transmission means can be achieved.

It is provided here for the pressure hoses to be designed in such a way that the electrical signals are conducted by means of the respective pressure hose (in particular through the pressure hose itself). The pressure hoses thus form the signal transmission means that are connected to the signal interfaces of the control unit and of the pneumatic units. The electrical signals are transmitted between the control unit and the pneumatic units in particular through the pressure hoses themselves.

A pneumatic unit is here connected to at least two different pressure hoses which are also connected to the control unit. This allows the use of an electric potential difference (voltage) as electrical signals, which is applied between at least two pressure hoses.

In order to apply the voltage, in particular a conductive electrical connection from the control unit to the pressure hose or from the pneumatic unit to the pressure hose is to be provided by means of the signal interfaces. The electric voltage is then preferably directly applied to the pressure hoses via the conductive connection.

In particular, the voltage between two pressure hoses may be varied as a function of time in order to communicate information.

In particular, the control unit of the system is at least electrically connected with the pressure hoses connected to the pneumatic units. As a result, any additional electrical wiring within the system may be dispensed with. Thus, installation complexity is simplified and construction costs may be saved. Since in the case of the known embodiment the fluid paths and the signal paths coincide, the risk of incorrect connections during installation may be reduced. Altogether, a system with reduced error susceptibility may be provided.

In principle, the pressure hoses may be designed for overpressure and vacuum. In a general sense, the pressure hoses conduct the working pressure, which may either be overpressure or vacuum. For example, pressure hoses transfer a working fluid with the required overpressure (in particular pressurised air) from a working fluid supply to valve devices and/or vacuum generators. On the other hand, pressure hoses can also transfer vacuum from a vacuum generator e.g. to a suction gripping device.

The pneumatic units may comprise various functional units, e.g. handling effectors that can be pneumatically operated, in particular for fixing and/or aspirating and/or handling a workpiece by means of vacuum, for example suction grippers. The pneumatic units comprise in particular at least one pneumatically operable vacuum generator (i.e. that can be operated using pressurised air supply) for supplying vacuum to the handling effectors. In particular, the vacuum generator is on the one hand connected to at least one pressure hose for pressure supply and is on the other hand connected to at least one further pressure hose that passes the generated vacuum to the handling effector.

The pneumatic units may also comprise drivable control valves that can be controlled by means of electrical signals from the control unit. In particular, a control valve is mounted in such a way that it can be used to control the pressurised air supply to the vacuum generator. It is a matter of course that the pneumatic units may also comprise further functional units, e.g. an actuator operated using working fluid, pneumatic cylinders or the like.

The electrical signals may represent measurement values that are sensed by sensors provided on the pneumatic units. By means of the electrical signals, information may be communicated in particular by way of a variation of the electrical signals as a function of time. These may here in principle be analog or digital signals. In general, the electrical signals may also comprise operating data of the pneumatic units and/or control signals of the control unit.

The mentioned operating data of the pneumatic units may represent different types of information, for example pressure, volume flow of pressurised air or other pneumatic data sensed by the sensors. It is also conceivable to use condition data that reflects the current operating condition and/or allows the functionality to be monitored (e.g. volume flow of the air flowing through the handling effectors, a cycle number etc.). Also conceivable are embodiments wherein the operating data comprises characteristic values of the handling effectors, so that the vacuum generator can carry out a functional vacuum supply by means of the characteristic values (for example a typical pressure threshold, a typical evacuation time, the current energy consumption, a maximum achieved vacuum in the handling effector as a measurement for the tightness of the system . . . ). Finally, the operating data may in principle also contain identification data that allows an individual detection of the handling effectors and includes for example information on the type of the connected handling effectors.

The control unit is preferably designed for evaluating operating data of the vacuum generator and/or operating data of the handling effector. In particular, the control unit is also designed for generating control signals as a function of the evaluated operating data. To this end, the control unit may have a correspondingly programmable microcontroller.

For further development, the pneumatic units may include sensors for detecting operating data. In particular, a sensor of the respective pneumatic unit is connected to the respective signal interface of the pneumatic unit, so that the operating data can be transmitted via the pressure hoses. The sensors are preferably integrated into the pneumatic units.

For fluid connection, the pneumatic units may include a hose coupling, which at least one pressure hose can be coupled with. It is preferably provided for the hose coupling also to provide the signal interface for transmitting the electrical signals. In particular, the electrical signal interface is integrated into the hose coupling. The hose coupling is designed to establish a fluid connection and can in addition also achieve the electric connection for signal transmission.

A simple contacting is made possible as a result of the fact that the hose coupling has a contact blade that is designed to cut into a contact layer of the pressure hose when connected to the pressure hose. The contact layer constitutes here a region of the pressure hose, via which electrical signals can be introduced into the pressure hose, so that they can be forwarded.

Specifically, the pressure hoses may include a hose wall that encloses an internal hose space for carrying a working fluid between the respective connected units. In this connection, the hose wall may altogether be formed from an electrically conductive material. It goes without saying that in addition a hose cover enclosing the hose wall may be provided, and the hose cover may be electrically insulating. It is also conceivable that at least two electric conductive wires are embedded in the hose wall. The conductive wires are preferably made from an electrically conductive material such as metal. It is here in particular conceivable that apart from that the hose wall is formed from an electrically insulating material.

The conductive wires may extend within the hose wall in the manner of a wire or of a strip. A strip-like design facilitates an easy contact because large contact areas may be provided. A wire-type embodiment of the conductive wires allows simple production and a low weight of the pressure hose.

In particular, the associated signal interface is designed in such a way that various conductive wires of a pressure hose may be electrically contacted independently of each other.

The invention will be explained in more detail below by means of the figures, wherein:

FIGS. 3 to 5 show schematic illustrations of cross sections of possible embodiments of the pressure hoses.

In the description following below and in the figures, the same reference signs have been used in each case for identical or corresponding features.

Figure 1:
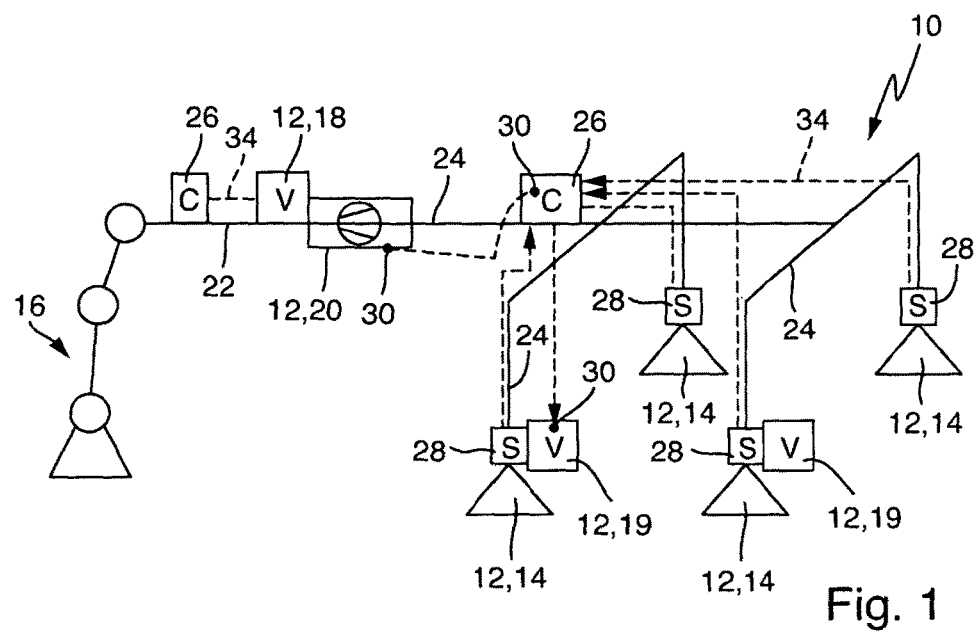
FIG. 1 shows a schematic illustration of a system for handling workpieces.

The method according to the invention as well as the system according to the invention will be explained by way of example using the system 10 for handling workpieces as illustrated in FIG. 1. The system 10 is designed as a pneumatic system and comprises a number of pneumatic units 12.

In the example shown, the pneumatic units 12 comprise a plurality of suction gripping devices 14 that form handling effectors 14 of the system 10. The suction gripping devices 14 may be provided on a suitable base frame (not shown in more detail). By means of such an overall assembly, also spatially extended workpieces may be fixed. In order to achieve a spatial displacement of the handling effectors 14, an actuator 16 may be provided, for example of the type of a robot arm (only schematically shown in FIG. 1).

The system 10 moreover comprises further pneumatic units, such as e.g. valve units 18 and control valves 19 for the handling effectors 14. In order to supply the required vacuum to the suction gripping devices 14, a vacuum generator (ejector) 20 operated using pressurised air is provided. The vacuum generator 20 also forms a pneumatic unit.

In the example shown, the vacuum generator 20 is connected to a pressurised air supply (not shown in more detail) by means of a pressure hose 22 schematically shown. At the other end, the vacuum generator 20 is connected to pressure hoses 24 that conduct the generated vacuum to the handling effectors. As schematically shown by way of example, the pressure hoses 24 (and correspondingly 22) extend between various pneumatic units 12 and connect the latter with each other. Moreover, the pressure hoses 22, 24 may lead from individual pneumatic units 12 to other units (e.g. to a central pressurised air supply).

In order to achieve a need-based control of the various pneumatic units 12, the system 10 has two control units 26 in the example shown. The control units 26 may in principle have various functions. For example, a control unit may be designed to receive and evaluate electrical signals from corresponding sensor units including sensors 28. In the example shown, these sensors 28 monitor a vacuum prevailing in the suction gripping device 14. Thus for example, a gripping condition may be detected. On the other hand, the control unit may be designed to emit electrical signals for controlling pneumatic units 12. In the example shown, controllable control valves 19 may be provided on some suction gripping devices 14, by way of example, which can be driven by means of the electrical signals from the control unit 26. Correspondingly, a valve unit 18 may be provided upstream of a pressure input of the vacuum generator 20 operated using pressurised air, which may be driven by means of electrical control signals from a control unit 26. In the schematic view according to FIG. 1, the associated signal paths, along which electrical signals are transmitted, are shown in dotted or dashed lines.

For the transmission of the electrical signals between control units 26 and pneumatic units 12, these units each have signal interfaces 30 (some of the signal interfaces 30 are schematically shown in FIG. 1 and are provided with a reference sign).

Figure 2:
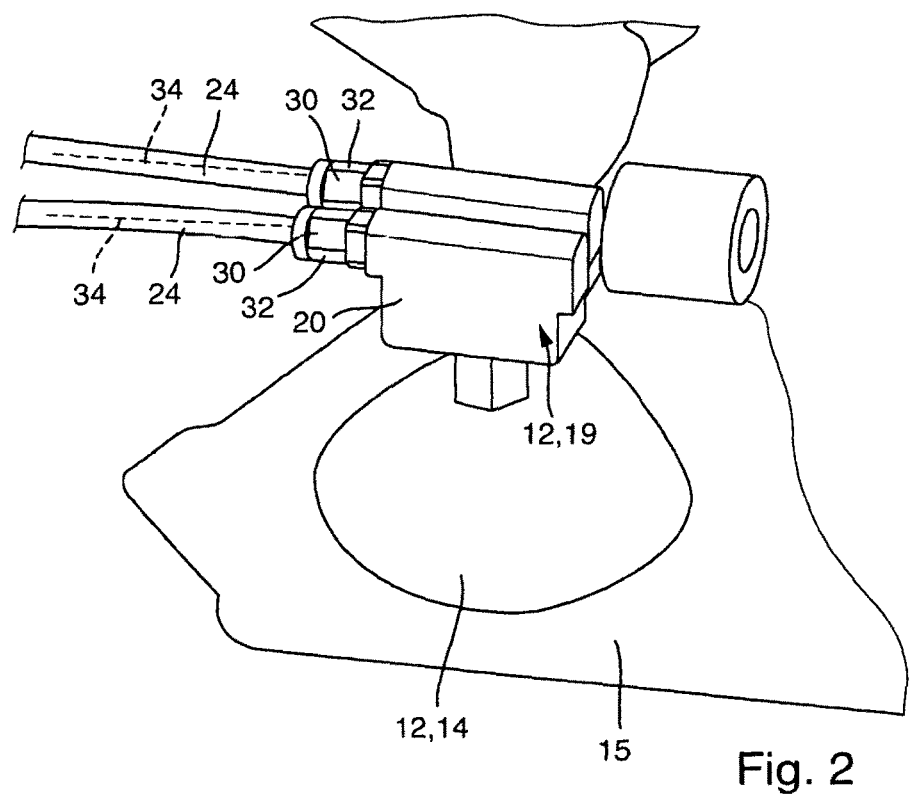
FIG. 2 shows a perspective illustration of a section of a system for handling workpieces comprising, inter alia, a valve device and a suction gripping device.

FIG. 2 shows a section from a system 10 with a suction gripping device 14 and a further pneumatic unit 12 associated therewith. The suction gripping device fixes a schematically shown workpiece 15. This pneumatic unit 12 comprises in particular a drivable control valve 19. In addition, also a vacuum generator 20 may be (optionally) integrated in the pneumatic unit 12. The pneumatic unit 12 is connected to two pressure hoses 24 (which carry, depending on the embodiment, overpressure or vacuum). Each pressure hose is in fluid communication with the pneumatic unit 12 via a hose coupling 32. The hose coupling 32 also comprises an integrated signal interface 30. This is designed such that the pressure hose 24 is electrically contacted in such a way that the pressure hose 24 can be used to conduct electrical signals to the pneumatic unit 12 and/or away from the pneumatic unit 12.

To this end, the pressure hoses 22 and 24 are designed such that electrical signals can be conducted by means of the pressure hoses. Insofar, the pressure hoses 22, 24 constitute signal transmission means 34 for the system 10. The signal transmission means 34 correspond to the signal transmission paths indicated in FIG. 1 by dashed or dotted lines.

A simple embodiment for a suitable pressure hose 24 is schematically shown in FIG. 3a (in a cross-sectional view through the pressure hose 24). The pressure hose 24 comprises a hose wall 36 that encloses an internal hose space 38. The material of the hose wall is formed to be electrically conductive at least in an inner contact layer 37 of the hose wall 36. For example, electrically conductive regions or particles may be embedded in the material of the hose wall 36 (e.g. a flexible polymer). What is also conceivable is an embodiment that is altogether made from an electric conductor. In addition, the hose wall 36 may be enclosed by a hose cover lying on the outside in relation to the internal hose space 38 (not shown).

FIG. 3b shows a schematic view of a corresponding hose coupling 32 in a cross-section, by means of which on the one hand fluid communication with a pressure input 40 and on the other hand an electric connection by means of the signal interface 30 may be provided. To this end, the hose coupling 32 may have an electric contact blade 42. This is formed and arranged in such a way that in the case of a coupling of the pressure hose 24 to the hose coupling 32, the contact blade cuts into the contact layer 37.

FIG. 4 shows a further embodiment for a pressure hose 24 in a cross-sectional view. Here, the hose wall 36 enclosing the internal hose space 38 is for example formed to be electrically insulating. Wire-like conductive wires 44 made from an electrically conductive material are embedded in the hose wall 36. The conductive wires 44 may also extend in a strip-like manner in the material of the hose wall 36, as indicated in the schematic view according to FIG. 5.

The system 10 and the mentioned embodiments allow the electrical signals to be transmitted between the pneumatic units 12 and the control units 26 by means of the pressure hoses 22, 24.

As schematically shown in FIG. 2, the respective pneumatic unit 12 is here connected to at least two different pressure hoses 24. These at least two different pressure hoses 24 are also connected to the control unit 26. The electrical signals are then transmitted via an electric voltage that is applied between the at least two pressure hoses 24.

The invention claimed is:

1. A method for operating a pneumatically operated system, wherein the system includes a plurality of pneumatic units that can be pneumatically operated or are configured for pneumatic control and have connections with pressure hoses and/or are in fluid communication with each other by means of pressure hoses, and comprising at least one control unit for driving at least one of the pneumatic units by means of electrical signals and/or for receiving and evaluating electrical signals from at least one of the pneumatic units, the method comprising:
    transmitting the electrical signals between the control unit and at least one pneumatic unit through the pressure hoses; and
    applying an electric voltage is applied between at least two different pressure hoses that connect the control unit and the respective pneumatic unit.

2. The method as claimed in claim 1, wherein the electric voltage is varied as a function of time.

3. The method as claimed in claim 2, wherein for transmitting the electrical signals between the control unit and the respective pneumatic unit, each have signal interfaces that provide a conductive electrical connection, and wherein the electric voltage is applied directly across the conductive connection to the pressure hoses.

4. A system for handling workpieces, said system comprising:
    a plurality of pneumatic units that can be pneumatically operated or are configured for pneumatic control, which have connections to pressure hoses and/or which are in fluid communication with each other by means of pressure hoses,
    at least one control unit for driving at least one of the pneumatic units by means of electrical signals and/or for receiving and evaluating electrical signals from at least one of the pneumatic units,
    wherein for transmitting the electrical signals between the control unit and the pneumatic unit, each have signal interfaces that are connected to each other by means of signal transmission means,
    wherein the pressure hoses are designed in such a way that the electrical signals can be conducted by means of the respective pressure hoses,
    wherein the pressure hoses constitute the signal transmission means that are connected to the signal interfaces,
    wherein the control unit is connected to the respective pneumatic unit via at least two different pressure hoses, and
    wherein the signal interfaces are configured to apply an electric voltage between the at least two different pressure hoses.

5. The system as claimed in claim 4, wherein the electric voltage is applied directly to the pressure hoses via a conductive connection between the signal interfaces.

6. The system as claimed in claim 5, wherein the pneumatic units comprise:
    at least one pneumatically operable handling effector,
    at least one pneumatically operable vacuum generator for supplying a vacuum to the handling effector.

7. The system as claimed in claim 6, wherein the pneumatic units comprise at least one drivable control valve that can be controlled by means of electrical signals from the control unit.

8. The system as claimed in claim 6, wherein the control unit is configured for evaluating operating data of the vacuum generator and/or operating data of the handling effector as well as for generating control signals as a function of the evaluated operating data.

9. The system as claimed in claim 8, wherein the pneumatic units have sensors for detecting operating data, and wherein a sensor of a respective pneumatic unit is connected with the respective signal interface of the pneumatic unit.

10. The system as claimed in claim 9, wherein the pressure hoses have a hose wall that encloses an internal hose space, wherein the hose wall is altogether made from an electrically conductive material.

11. The system as claimed in claim 9, wherein the pneumatic unit has a hose coupling for connection with the respective pressure hoses, wherein the hose coupling provides the signal interface.

12. The system as claimed in claim 11, wherein the hose coupling has a contact blade configured to cut into a contact layer of the pressure hose when connected with the pressure hose.

13. The system as claimed in claim 12, wherein the pressure hoses have a hose wall that encloses an internal hose space, wherein at least two electrical conductive wires are embedded in the hose wall.

* * * * *